United States Patent [19]
Kato et al.

[11] 4,258,896
[45] Mar. 31, 1981

[54] DRIVER'S SEAT MOUNTING APPARATUS FOR A MOTOR VEHICLE

[75] Inventors: Keizo Kato; Shigeru Kashihara, both of Sakai, Japan

[73] Assignee: Kubota, Ltd., Osaka, Japan

[21] Appl. No.: 20,374

[22] Filed: Mar. 14, 1979

[30] Foreign Application Priority Data

Aug. 31, 1978 [JP] Japan .................. 53/121088[U]

[51] Int. Cl.³ .............................................. F16M 13/00
[52] U.S. Cl. ...................................... 248/573; 248/429
[58] Field of Search ............... 248/393, 394, 395, 429, 248/430, 585, 586, 587, 573; 297/346; 74/527

[56] References Cited

U.S. PATENT DOCUMENTS

| | | | |
|---|---|---|---|
| 2,441,510 | 5/1948 | Robinson | 248/573 |
| 2,936,818 | 5/1960 | Harrington et al. | 248/585 X |
| 3,170,666 | 2/1965 | Reiter et al. | 248/430 |
| 3,275,277 | 9/1966 | Illar et al. | 248/585 X |
| 3,319,920 | 5/1967 | Freedman et al. | 248/585 X |
| 3,608,855 | 9/1971 | Osenberg | 248/585 X |
| 3,702,179 | 11/1972 | Radke et al. | 248/430 |
| 3,954,245 | 5/1976 | Costin | 248/585 X |
| 3,994,469 | 11/1976 | Swenson et al. | 248/585 |
| 3,999,800 | 12/1976 | Penzotti | 248/585 X |
| 4,034,948 | 7/1977 | Brownell | 248/585 |

FOREIGN PATENT DOCUMENTS

| | | | |
|---|---|---|---|
| 205363 | 2/1959 | Austria | 248/586 |
| 1405783 | 12/1968 | Fed. Rep. of Germany | 248/586 |
| 1319292 | 4/1962 | France | 248/585 |
| 371099 | 6/1973 | U.S.S.R. | 248/585 |

*Primary Examiner*—J. Franklin Foss
*Attorney, Agent, or Firm*—Edwin E. Greigg

[57] ABSTRACT

A driver's seat mounting apparatus for a motor vehicle having a driver's seat shiftable either forward or rearward along rails. Rail supporting members for said shiftable driver's seat are disposed lower than a seat supporting portion mounted on the top surface of a suspension.

3 Claims, 3 Drawing Figures

DRIVER'S SEAT MOUNTING APPARATUS FOR A MOTOR VEHICLE

BACKGROUND OF THE INVENTION

This invention relates to a driver's seat mounting apparatus for a motor vehicle such as a tractor and the like, which provides, at both the right and left sides of a seat supporting portion of a suspension having said portion on the top surface thereof, supporting members of rails for supporting a driver's seat shiftable forward and rearward.

Such a seat mounting apparatus for a motor vehicle has an advantage of providing a driver with a comfortable seating and of permitting him to operate operating members such as a hand wheel, a clutch pedal, a brake pedal and the like with ease by changing the seat position forward or rearward to suit for a driver's build.

SUMMARY OF THE INVENTION

An object of this invention is to obtain effects in both comfortable seating and easy operation for operating members by improving the arrangement of the members without increasing the seat height relative to the vehicle.

In order to achieve the above mentioned object, in the driver's seat mounting apparatus for a motor vehicle provided with the above mentioned construction, the present invention is characterized by disposing both of the rail supporting members lower than a seat supporting portion on the top surface of a suspension.

In the present invention, instead of arranging the suspension, the rails and the seat in order in a simple building-up system, a space, located between the seat and the vehicle body and beside the suspension is effectively utilized to dispose both the rail supporting members and the rails. In other words, since the rails are disposed on a level with the top surface of the suspension, the seat height relative to the vehicle can be decreased as much as the rail height by lowering the seat, without decreasing the strength of the elements, such as in the suspension, rails and the like, due to their miniaturization.

Furthermore, since there still remains sufficient clearance in the vertical direction between the rail supporting members, on opposite sides of the suspension, and the vehicle body, this clearance permits the suspension travel to be enlarged and and thus a high cushioning effect obtained satisfactorily in addition adjustment of the seat position, and assembling and disassembling of the seat and the suspension are easily carried out.

Further, when shock absorbing rubber elements are inserted between the rail supporting members and the rails in the above mentioned space, those rubber elements will increase the suspension effect, causing much more comfortable seating for the driver.

As mentioned above, the invention achieves improved effects in suspension operation while making the seat position as low as possible, through the improvement in the rail supporting members.

BRIEF DESCRIPTION OF THE DRAWINGS

The drawings show an embodiment of a driver's seat mounting apparatus for a motor vehicle according to the present invention in which.

DETAILED DESCRIPTION OF THE PREFERRED EMBODIMENT

Figure 1:
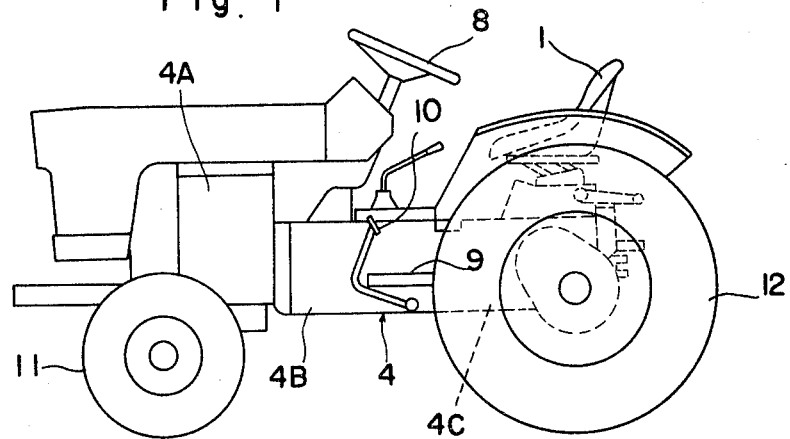
FIG. 1 is a side view of a tractor.
Figure 2:
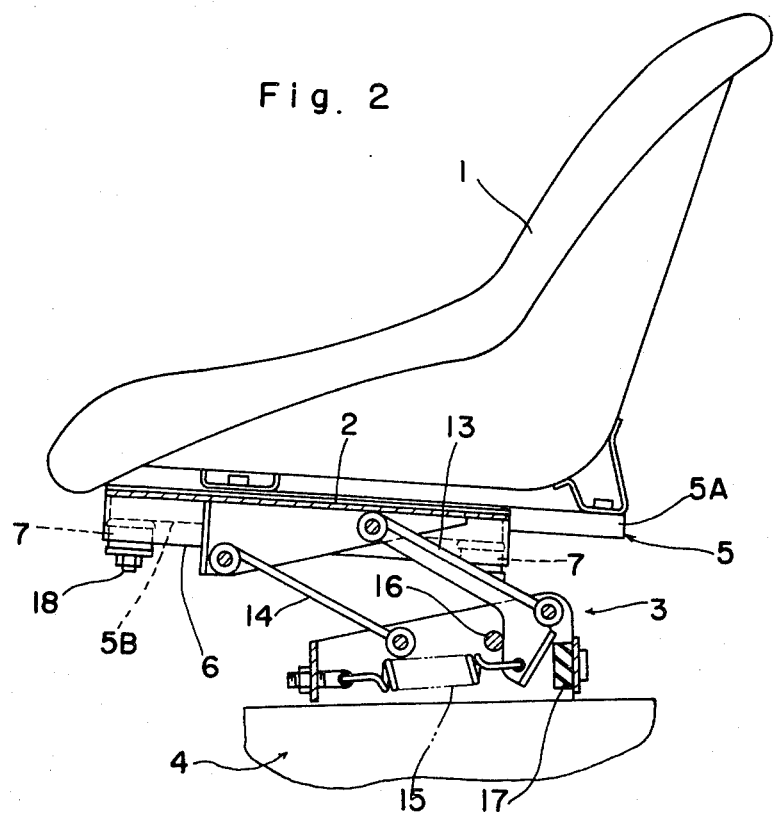
FIG. 2 is an enlarged side view of a seat structure with portions broken away.
Figure 3:
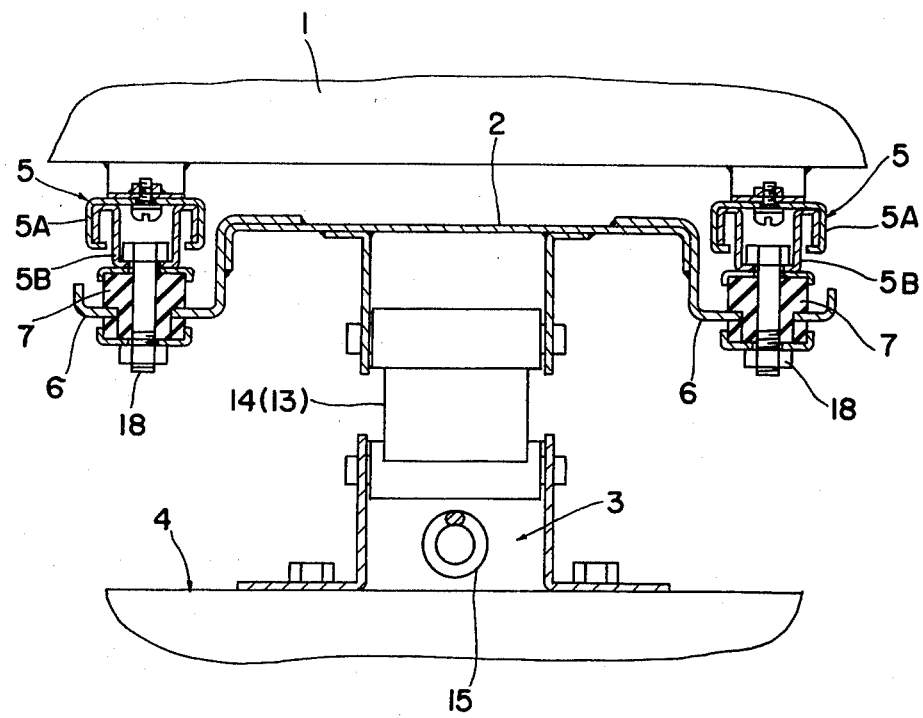
FIG. 3 is an enlarged sectional front view of the seat structure.

FIG. 1 shows a tractor (as an example of a motor vehicle). The vehicle 4 comprises an engine 4A, a transmission case 4B and a differential gear case 4C which are positively connected to each other. A driver's seat 1 is mounted on the upper portion of the differential gear case 4C and a steering wheel 8 is mounted in front of the driver's seat 1. Further, a foot rest 9 and a clutch pedal 10 are arranged on the transmission case 4B. 11 indicates a pair of front sterrable wheels and 12 indicates a pair of rear driving wheels. FIG. 2 and FIG. 3 show a seat frame structure for mounting the driver's seat 1 on the vehicle body 4. 3 indicates a suspension on which a seat supporting portion is formed. This suspension 3 comprises a pair of front and rear links 13, 14 connecting the seat supporting portion 2 to the vehicle body 4 to move the seat supporting portion 2 up and down in almost constant attitude, a spring 15 which acts on the link 13 to urge the seat supporting portion 2 upwardly, a stop 16 which prevents the seat supporting portion 2 from rising too far from the desired position by contacting with the link 13, and a shock absorbing rubber stopper 17 which is in contact with the link 13 and prevents the seat supporting portion 2 from lowering beyond the desired position. The driver's seat 1 is mounted on the seat supporting portion 2 of the suspension 3 as follows: Supporting members 6, 6 are integral with the right and left sides of the seat supporting portion 2. Rails 5, 5 are mounted between the rail supporting members 6, 6 and the undersurface of the driver's seat 1 facing the rail supporting members 6, 6 so that the driver's seat 1 can be moved only forwardly and rearwardly and fixed in the desired position.

Each of the rails 5, 5 comprises a movable rail member 5A which is fixed to the undersurface of the driver's seat 1, and a stationary rail member 5B which is fixed to each of the rail supporting members 6, 6 by means of bolts and nuts 18. Shock absorbing rubber 7, 7 are disposed between the elements rail supporting members 6, 6 and the stationary rail members 5B, 5B of the rails 5, 5. The supporting members 6, 6 are thus disposed in a lower position such that the rails 5, 5 can be kept on a level with the seat supporting portion 2 of the suspension 3.

What we claim is:

1. A driver's seat mounting apparatus for a motor vehicle comprising: a suspension mounted on an upper surface of a vehicle body and having a seat supporting member mounted on a top portion thereof, rail supporting members provided on right and left sides of the seat supporting member, and right and left rail members mounted on the rail supporting members for carrying a driver's seat shiftable forwardly and rearwardly, characterized in that said rail supporting members are disposed in a plane lower than the seat supporting member and shock absorbing rubber elements are interposed between the driver's seat and said rail supporting members.

2. The apparatus of claim 1 further wherein said shock absorbing rubber elements are disposed between said rail supporting members and said rails.

3. The apparatus of claim 2 wherein said suspension comprises a pair of front and rear links connected to the vehicle to move said seat supporting portion up and down to maintain a substantially planar attitude thereof, a spring acting on one of the links to urge said seat supporting portion upward, a stop for preventing said seat supporting portion from moving beyond a desired position by contact with one of said links and a shock absorbing rubber stop for preventing said seat supporting portion from declining below the desired position by contact with one of the links.

* * * * *